US012651594B2

(12) United States Patent
Wang et al.

(10) Patent No.: US 12,651,594 B2
(45) Date of Patent: Jun. 9, 2026

(54) MULTI-OUTPUT DECODERS FOR MULTI-TASK LEARNING OF ASR AND AUXILIARY TASKS

(71) Applicant: Google LLC, Mountain View, CA (US)

(72) Inventors: Weiran Wang, San Jose, CA (US); Ding Zhao, Mountain View, CA (US); Shaojin Ding, Mountain View, CA (US); Hao Zhang, Jericho, NY (US); Shuo-yiin Chang, Sunnyvale, CA (US); David Johannes Rybach, Munich (DE); Tara N. Sainath, Jersey City, NJ (US); Yanzhang He, Mountain View, CA (US); Ian McGraw, Mountain View, CA (US); Shankar Kumar, New York, NY (US)

(73) Assignee: Google LLC, Mountain View, CA (US)

(*) Notice: Subject to any disclaimer, the term of this patent is extended or adjusted under 35 U.S.C. 154(b) by 314 days.

(21) Appl. No.: 18/494,984

(22) Filed: Oct. 26, 2023

(65) Prior Publication Data

US 2024/0153495 A1     May 9, 2024

Related U.S. Application Data

(60) Provisional application No. 63/381,119, filed on Oct. 26, 2022.

(51) Int. Cl.
*G10L 15/26*     (2006.01)
*G06F 40/284*     (2020.01)
*G10L 15/06*     (2013.01)
(52) U.S. Cl.
CPC .......... *G10L 15/063* (2013.01); *G06F 40/284* (2020.01); *G10L 15/26* (2013.01)

(58) Field of Classification Search
None
See application file for complete search history.

(56) References Cited

U.S. PATENT DOCUMENTS 8,494,853 B1 *   7/2013   Mengibar ............. G10L 15/065
                                             704/235
9,858,925 B2 *   1/2018   Gruber ................... G10L 15/18
                         (Continued)

OTHER PUBLICATIONS

Liu Chunxi et al: "Improving RNN Transducer Based ASR with Auxiliary Tasks", 2021 IEEE Spoken Language Technology Workshop (SLT), IEEE, Jan. 19, 2021 (Jan. 19, 2021), pp. 172-179.
(Continued)

*Primary Examiner* — Neeraj Sharma
(74) *Attorney, Agent, or Firm* — Honigman LLP; Brett A. Krueger; Grant Griffith

(57)     ABSTRACT

A method includes receiving a training dataset that includes one or more spoken training utterances for training an automatic speech recognition (ASR) model. Each spoken training utterance in the training dataset paired with a corresponding transcription and a corresponding target sequence of auxiliary tokens. For each spoken training utterance, the method includes generating a speech recognition hypothesis for a corresponding spoken training utterance, determining a speech recognition loss based on the speech recognition hypothesis and the corresponding transcription, generating a predicted auxiliary token for the corresponding spoken training utterance, and determining an auxiliary task loss based on the predicted auxiliary token and the corresponding target sequence of auxiliary tokens. The method also includes the ASR model jointly on the speech recognition loss and the auxiliary task loss determined for each spoken training utterance.

18 Claims, 9 Drawing Sheets

(56)     References Cited

U.S. PATENT DOCUMENTS

| | | | | |
|---|---|---|---|---|
| 9,922,642 | B2 * | 3/2018 | Pitschel ................ | G10L 15/063 |
| 11,688,394 | B1 * | 6/2023 | Filimonov ........... | G06N 3/0455 |
| | | | | 704/231 |
| 12,087,306 | B1 * | 9/2024 | Le ........................... | G10L 15/28 |
| 2003/0055655 | A1 * | 3/2003 | Suominen ............... | G10L 15/22 |
| | | | | 704/E15.04 |
| 2007/0043567 | A1 * | 2/2007 | Gao ........................ | G10L 15/26 |
| | | | | 704/E15.045 |
| 2007/0100635 | A1 * | 5/2007 | Mahajan ................. | G10L 15/22 |
| | | | | 704/E15.04 |
| 2019/0065462 | A1 * | 2/2019 | Salloum .................. | G06F 40/44 |
| 2022/0262356 | A1 * | 8/2022 | Ogawa .................. | G10L 15/197 |
| 2024/0031339 | A1 * | 1/2024 | Goel ........................ | H04L 63/04 |

OTHER PUBLICATIONS

Boyer, Florian et al: "A Study of Transducer Based End-to-End ASR with ESPnet: Architecture, Auxiliary Loss and Decoding Strategies", 2021 IEEE Automatic Speech Recognition and Understanding Workshop (ASRU), IEEE, Dec. 13, 2021 (Dec. 13, 2021), pp. 16-23.
International Search Report and Written Opinion issued in related PCT application No. PCT/US2023/035992, dated Feb. 13, 2024.

* cited by examiner $$P(\hat{y}_i \mid x_0, \ldots, x_{t_i}, y_0, \ldots, y_{u_{i-1}})$$

Softmax 260

$z_i$

Joint Network 250

$p_{u_i}$          $h_{t_i}^{enc}$

Prediction Network 300          Encoder 204

$y_{u_{i-1}}$          $x_{t_i}$

MULTI-OUTPUT DECODERS FOR MULTI-TASK LEARNING OF ASR AND AUXILIARY TASKS

CROSS REFERENCE TO RELATED APPLICATIONS

This U.S. Patent Application claims priority under 35 U.S.C. § 119(e) to U.S. Provisional Application 63/381,119, filed on Oct. 26, 2022. The disclosure of this prior application is considered part of the disclosure of this application and is hereby incorporated by reference in its entirety.

TECHNICAL FIELD

This disclosure relates to multi-output RNN-T joint networks for multi-task learning of ASR and auxiliary tasks.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the client speaking and the transcription) based on the ongoing development of deep neural networks. Some ASR models perform other speech-related tasks in addition to transcribing speech into text. As a result, however, the accuracy and latency of transcribing speech into text degrades because of the integration of the other speech-related tasks. Accordingly, the performance degradation makes these multi-task ASR models unsuitable for many applications.

SUMMARY

One aspect of the disclosure provides a computer-implemented method that when executed on data processing hardware causes the data processing hardware to perform operations of training a multi-output joint network for multi-task learning. The operations include receiving a training dataset that includes one or more spoken training utterances for training an automatic speech recognition (ASR) model. Each spoken training utterance in the training dataset is paired with a corresponding transcription and a corresponding target sequence of auxiliary tokens. For each spoken training utterance of the one or more spoken training utterances, the operations include: generating, by a joint network of the ASR model, a speech recognition hypothesis for a corresponding spoken training utterance of the one or more spoken training utterances; determining a speech recognition loss based on the speech recognition hypothesis generated by the joint network for the corresponding spoken training utterance and the corresponding transcription; generating, by the joint network of the ASR model, a predicted auxiliary token for the corresponding spoken training utterance of the one or more spoken training utterances; and determining an auxiliary task loss based on the predicted auxiliary token generated by the joint network for the corresponding spoken training utterance and the corresponding target sequence of auxiliary tokens. The operations also include training the ASR model jointly on the speech recognition loss and the auxiliary task loss determined for each spoken training utterance.

Implementations of the disclosure may include one or more of the following optional features. In some implementations, the ASR model includes: a causal encoder configured to receive, as input, a sequence of acoustic frames characterizing each of the one or more spoken training utterances and generate, at each of a plurality of output steps, a first higher order feature representation for a corresponding acoustic frame in the sequence of acoustic frames; a first prediction network configured to receive, as input, a first sequence of non-blank symbols output by a final softmax layer and generate, at each of the plurality of output steps, a first dense representation; and a first joint network configured to receive, as input, the first higher order feature representation generated by the causal encoder at each of the plurality of output steps and the first dense representation generated by the first prediction network at each of the plurality of output steps and generate, at each of the plurality of output steps, an initial speech recognition hypothesis and an initial predicted auxiliary token. In these implementations, the ASR model may include: a non-causal causal encoder configured to receive, as input, the first higher order feature representation generated by the causal encoder at each of the plurality of output steps and generate, at each of a plurality of output steps, a second higher order feature representation for a corresponding first higher order feature representation; a second prediction network configured to receive, as input, a second sequence of non-blank symbols output by the final softmax layer and generate, at each of the plurality of output steps, a second dense representation; and a second joint network configured to receive, as input, the second higher order feature representation generated by the non-causal encoder at each of the plurality of output steps and the second dense representation generated by the second prediction network at each of the plurality of output steps and generate a final speech recognition hypothesis and a final predicted auxiliary token.

In some examples, the joint network generates the speech recognition hypothesis and the predicted auxiliary token synchronously. In other examples, the joint network generates the speech recognition hypothesis and the predicted auxiliary token asynchronously. For each corresponding transcription, the operations may further include converting each uppercase letter of the corresponding transcription into a corresponding lowercase letter, inserting capitalization tokens before each converted uppercase letter, tokenizing the converted transcription into a sequence of tokens that includes wordpiece tokens and the capitalization tokens, and generating the corresponding target sequence of auxiliary tokens by aligning each capitalization token with a corresponding one of the wordpiece tokens.

In some implementations, the predicted auxiliary token includes a capitalization token or a non-capitalization token. In these implementations, the auxiliary task loss may include an uppercase error rate loss. In some examples, the predicted auxiliary token includes at least one of a non-pause token, a stop token, or a continuation token. In these examples, the auxiliary task loss may include a pause prediction loss.

Another aspect of the disclosure provides a system that includes data processing hardware and memory hardware storing instructions that when executed on the data processing hardware cause the data processing hardware to perform operations. The operations include receiving a training dataset that includes one or more spoken training utterances for training an automatic speech recognition (ASR) model.

Each spoken training utterance in the training dataset is paired with a corresponding transcription and a corresponding target sequence of auxiliary tokens. For each spoken training utterance of the one or more spoken training utterances, the operations include: generating, by a joint network of the ASR model, a speech recognition hypothesis for a corresponding spoken training utterance of the one or more spoken training utterances; determining a speech recognition loss based on the speech recognition hypothesis generated by the joint network for the corresponding spoken training utterance and the corresponding transcription; generating, by the joint network of the ASR model, a predicted auxiliary token for the corresponding spoken training utterance of the one or more spoken training utterances; and determining an auxiliary task loss based on the predicted auxiliary token generated by the joint network for the corresponding spoken training utterance and the corresponding target sequence of auxiliary tokens. The operations also include training the ASR model jointly on the speech recognition loss and the auxiliary task loss determined for each spoken training utterance.

Implementations of the disclosure may include one or more of the following optional features. In some implementations, the ASR model includes: a causal encoder configured to receive, as input, a sequence of acoustic frames characterizing each of the one or more spoken training utterances and generate, at each of a plurality of output steps, a first higher order feature representation for a corresponding acoustic frame in the sequence of acoustic frames; a first prediction network configured to receive, as input, a first sequence of non-blank symbols output by a final softmax layer and generate, at each of the plurality of output steps, a first dense representation; and a first joint network configured to receive, as input, the first higher order feature representation generated by the causal encoder at each of the plurality of output steps and the first dense representation generated by the first prediction network at each of the plurality of output steps and generate, at each of the plurality of output steps, an initial speech recognition hypothesis and an initial predicted auxiliary token. In these implementations, the ASR model may include: a non-causal causal encoder configured to receive, as input, the first higher order feature representation generated by the causal encoder at each of the plurality of output steps and generate, at each of a plurality of output steps, a second higher order feature representation for a corresponding first higher order feature representation; a second prediction network configured to receive, as input, a second sequence of non-blank symbols output by the final softmax layer and generate, at each of the plurality of output steps, a second dense representation; and a second joint network configured to receive, as input, the second higher order feature representation generated by the non-causal encoder at each of the plurality of output steps and the second dense representation generated by the second prediction network at each of the plurality of output steps and generate a final speech recognition hypothesis and a final predicted auxiliary token.

In some examples, the joint network generates the speech recognition hypothesis and the predicted auxiliary token synchronously. In other examples, the joint network generates the speech recognition hypothesis and the predicted auxiliary token asynchronously. For each corresponding transcription, the operations may further include converting each uppercase letter of the corresponding transcription into a corresponding lowercase letter, inserting capitalization tokens before each converted uppercase letter, tokenizing the converted transcription into a sequence of tokens that includes wordpiece tokens and the capitalization tokens, and generating the corresponding target sequence of auxiliary tokens by aligning each capitalization token with a corresponding one of the wordpiece tokens.

In some implementations, the predicted auxiliary token includes a capitalization token or a non-capitalization token. In these implementations, the auxiliary task loss may include an uppercase error rate loss. In some examples, the predicted auxiliary token includes at least one of a non-pause token, a stop token, or a continuation token. In these examples, the auxiliary task loss may include a pause prediction loss.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
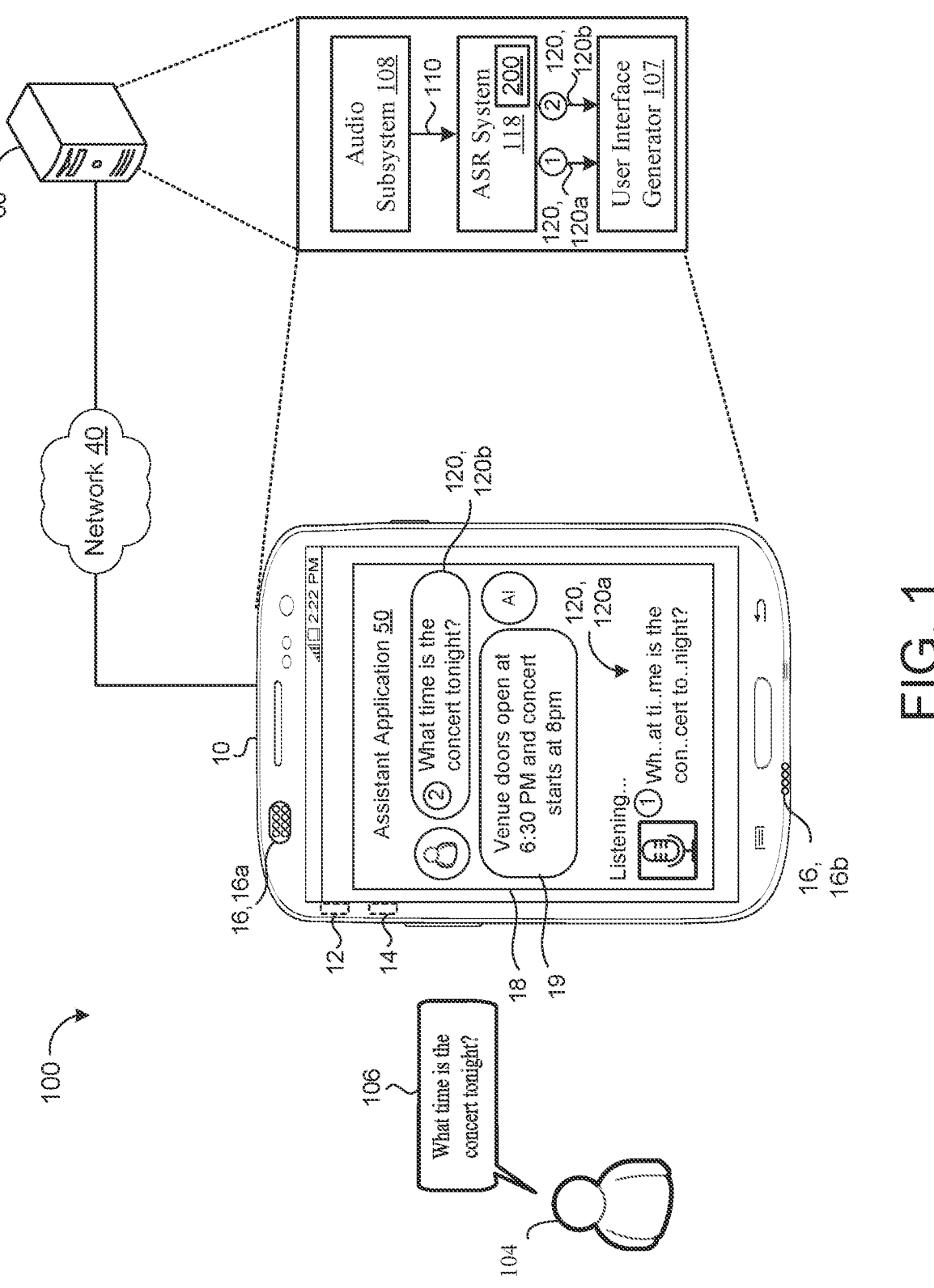
FIG. 1 is a schematic view of an example speech recognition system.

Training end-to-end (E2E) automatic speech recognition (ASR) models aims to jointly optimize different components of the ASR model using a single neural network. Typically, the single neural network of the ASR model combines acoustic, pronunciation, and language models such that the single neural network performs an ASR task of transcribing text from input audio data. Recently, some E2E ASR models have integrated other auxiliary tasks in addition to the ASR task. There are numerous benefits of integrating auxiliary tasks into the E2E ASR model including the auxiliary tasks having access to both acoustic and language model features of the ASR model and introducing only a relatively small amount of additional parameters to the ASR model since the auxiliary tasks share most parameters with the ASR task.

Performing auxiliary tasks requires the ASR model to predict auxiliary tokens in addition to predicting wordpiece tokens used for the ASR task. As a result, however, the auxiliary tokens degrade performance of the ASR task (e.g., accuracy and latency) because the auxiliary tokens provide information not relevant to the ASR task. In particular, since decoders of E2E ASR models operate autoregressively given a previous N tokens, injecting auxiliary tokens into a history of the previous N tokens complicates the ASR task because the auxiliary tokens do not provide useful information for ASR. Accordingly, some approaches use two separate joint networks whereby a first joint network predicts wordpiece tokens and a second joint network predicts auxiliary tokens in addition to the wordpiece tokens. In this approach, the first joint network performs the ASR task during inference because the first joint network does not generate any auxiliary tokens and the second joint network performs the auxiliary task using the auxiliary tokens. Yet, while the second joint network is trained on wordpiece tokens and auxiliary tokens, only the auxiliary tokens are used from the second joint network during inference. Consequently, the lack of a cleaner separation between target spaces for ASR tasks and auxiliary tasks (e.g., while allowing both tasks to share useful features) make it difficult to scale this approach to more auxiliary tasks. Moreover, training the second joint network using wordpiece tokens and auxiliary tokens while only using the auxiliary tokens during inference causes redundant parameters that increase a size of the ASR model without any benefit.

Accordingly, implementations herein are directed towards methods and systems of a multi-output joint network for multi-task learning of speech recognition and auxiliary tasks. In particular, a training process receives a training dataset that includes training utterances for training an automatic speech recognition (ASR) model. Each spoken training utterance is paired with a corresponding transcription and a corresponding target sequence of auxiliary tokens. For each spoken training utterance, the training process generates a speech recognition hypothesis for a corresponding spoken training utterance using a joint network of the ASR model and determines a speech recognition loss based on the speech recognition hypothesis and the corresponding transcription. Moreover, for each spoken training utterance, the training process also generates a predicted auxiliary token for the corresponding spoken training utterance and determines an auxiliary task loss based on the predicted auxiliary token and the corresponding target sequence of auxiliary tokens. Thereafter, the training process trains the ASR model jointly on the speech recognition loss and auxiliary task loss determined for each spoken training utterance.

Training the ASR model jointly on the speech recognition losses and the auxiliary task losses teaches the ASR model to perform speech recognition and an auxiliary task. The auxiliary task may include capitalization of text and/or pause predictions. As will become apparent, the ASR model includes a single joint network that generates outputs for both speech recognition and the auxiliary tasks. In some examples, the ASR model includes two joint networks, one for operating in a streaming manner and another for operating in a non-streaming manner. In these examples, however, it is understood that each joint network generates wordpiece tokens for speech recognition and auxiliary tokens for the auxiliary task. In other examples, the ASR model includes a single joint network that operates in either the streaming or non-streaming manner.

FIG. 1 is an example system 100 that includes one or more users 104 interacting with a user device 10 through voice input. The user device 10 (also referred to generally as a device 10) is configured to capture sounds (e.g., streaming audio data) from the one or more users 104 within the system 100. Here, the streaming audio data may refer to an utterance 106 spoken by the user 104 that functions as an audible query, a command for the user device 10, or an audible communication captured by the device 10. Speech-enabled systems of the user device 10 may field the query or the command by answering the query and/or causing the command to be performed/fulfilled by one or more downstream applications.

The user device 10 may correspond to any computing device associated with the user 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions that, when executed by the data processing hardware 12, cause the data processing hardware 12 to perform one or more operations. The user device 10 further includes an audio system 16 with an audio capture device (e.g., microphone) 16, 16a for capturing and converting the utterances 106 into electrical signals and a speech output device (e.g., a speaker) 16, 16b for communicating with an audible audio signal (e.g., as output data from the user device 10). The user device 10 may implement an array of audio capture devices 16a without departing from the scope of the present disclosure, whereby one or more capture devices 16a in the array may not physically reside on the user device 10, but be in communication with the audio system 16.

The system 100 includes an automated speech recognition (ASR) system 118 that implements an ASR model 200 and resides on the user device 10 of the user 104 and/or on a remote computing device 60 (e.g., one or more remote servers of a distributed system executing in a cloud-computing environment) in communication with the user device 10 via a network 40. In some examples, the ASR model 200 may be a Recurrent Neural Network-Transducer (RNN-T) model. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., sequence of acoustic frames) 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model receives (e.g., processes) each acoustic frame 110 in the sequence of acoustic frames 110.

In the example shown, the ASR model 200 may perform streaming speech recognition to produce an initial speech recognition result 120, 120a and generate a final speech recognition result 120, 120b by improving the initial speech recognition result 120a. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance or even a portion of a spoken term. However, as will become apparent, the ASR model 200 performs additional processing on the final speech recognition result 120b whereby the final speech recognition result 120*b* may be delayed from the initial speech recognition result 120*a*.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120*a* in a streaming fashion during time 1 and subsequently display the final speech recognition results 120*b* in a streaming fashion during time 2. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16*a* and processed by audio systems 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120*a*. During time 1, the user interface generator 107 presents, via the digital assistant interface 18, a representation of the initial speech recognition results 120*a* of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition results 120*b* of the utterance 106 to the user 104 of the user device 10 a streaming fashion such that words, word pieces, and/or individual characters appear on the screen as soon as they are generated by the ASR model 200. In some implementations, the user interface generator 107 replaces the representation of the initial speech recognition results 120*a* presented at time 1 with the representation of the final speech recognition results 120*b* presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120*a* at an earlier time than the final speech recognition results 120*b*. For instance, as the final speech recognition result 120*b* is presumed to be more accurate than the initial speech recognition result 120*a*, the final speech recognition result 120*b* ultimately displayed as the transcription 120 may fix any terms that may have been misrecognized in the initial speech recognition results 120*a*. In this example, the streaming initial speech recognition results 120*a* output by the ASR model 200 are displayed on the screen of the user device 10 at time 1 are associated with low latency and provide responsiveness to the user 104 that his/her query is being processed, while the final speech recognition result 120*b* output by the ASR model 200 and displayed on the screen at time 2 leverages an additional speech recognition model and/or a language model to improve the speech recognition quality in terms of accuracy, but at increased latency. However, since the initial speech recognition results 120*a* are displayed as the user speaks the utterance 106, the higher latency associated with producing, and ultimately displaying the final speech recognition results 120*b* is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition result 120*a* and/or the final speech recognition result 120*b*) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on the remote computing device 60 in communication with the data processing hardware 12 of the user device 10.

Figure 2:
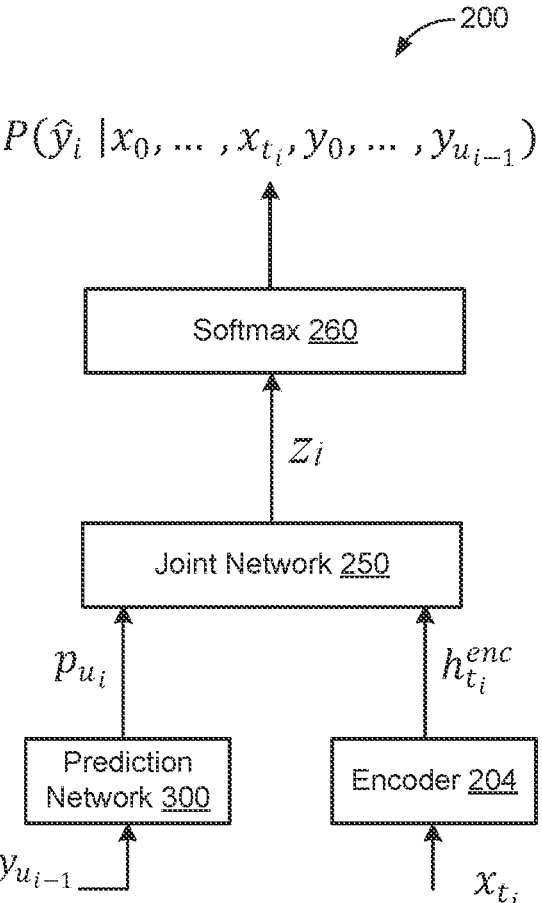
FIG. 2 is a schematic view of an example speech recognition model.

Referring to FIG. 2, an example ASR model 200 may include a Recurrent Neural Network-Transducer (RNN-T) model architecture which adheres to latency constraints associated with interactive applications. The use of the RNN-T model architecture is exemplary only, and the ASR model 200 may include other architectures such as transformer-transducer and conformer-transducer model architectures among others. The RNN-T model architecture provides a small computational footprint and utilizes less memory requirements than conventional ASR architectures, making the RNN-T model architecture suitable for performing speech recognition entirely on the user device 102 (e.g., no communication with a remote server is required). The RNN-T model architecture of the ASR model 200 includes an encoder network 204, a prediction network 300, and a joint network 250. The encoder network 204, which is roughly analogous to an acoustic model (AM) in a traditional ASR system, includes a recurrent network of stacked Long Short-Term Memory (LSTM) layers. For instance, the encoder network (e.g., encoder) 204 reads a sequence of d-dimensional feature vectors (e.g., sequence of acoustic frames 110 (FIG. 1)) $x=(x_1, x_2, \ldots, x_T)$, where $x_t \in \mathbb{R}_d$, and produces, at each of a plurality of output steps, a higher-order feature representation. This higher-order feature representation may also be denoted as $$h_1^{enc}, \ldots, h_T^{enc}.$$

Similarly, the prediction network 300 is also an LSTM network, which, like a language model (LM), processes the sequence of non-blank symbols output by a final Softmax layer 260 so far, $y_0, \ldots, y_{ui-1}$, into a dense representation $p_{u_i}$. Finally, with the RNN-T model architecture, the representations produced by the encoder and prediction/decoder networks 204, 300 are combined by the joint network 250. The prediction network 300 may be replaced by an embedding look-up table to improve latency by outputting looked-up sparse embeddings in lieu of processing dense representations. The joint network 250 then predicts $P(y_i|x_{t_i}, y_0, \ldots, y_{u_{i-1}})$, which is a distribution over the next output symbol. Stated differently, the joint network 250 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 250 can include a posterior probability value for each of the different output labels. Thus, if there are 100 different output labels representing different graphemes or other symbols, the output $y_i$ of the joint network 250 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 260 may employ any technique to select the output label/symbol with the highest probability in the distribution as the next output symbol predicted by the ASR model 200 at the corresponding output step. In this manner, the RNN-T model architecture of the ASR model 200 does not make any conditional independent assumptions, rather the prediction of each symbol is conditioned not only on the acoustic frames but also on the sequence of labels output so far. As such, the Softmax layer 260 may select the speech recognition hypothesis having a highest corresponding probability from the probability distribution as the transcription 120. The ASR model 200 does assume an output symbol is independent of future acoustic frames 110, which allows the ASR model 200 to be employed in a streaming fashion.

In some examples, the encoder 204 of the ASR model 200 includes a plurality of multi-head (e.g., 8 heads) self-attention layers. For example, the plurality of multi-head self-attention layers may include Conformer layers (e.g., Conformer-encoder), transformer layers, performer layers, convolution layers (including lightweight convolution layers), or any other type of multi-head self-attention layers. The plurality of multi-head self-attention layers may include any number of layers, for instance 16 layers. Moreover, the encoder 204 may operate in a streaming fashion (e.g., the encoder 204 outputs the higher-order feature representations as soon as they are generated) or in a non-streaming fashion whereby the encoder 204 processes additional right-context to improve upon the speech recognition results.

Figure 3:
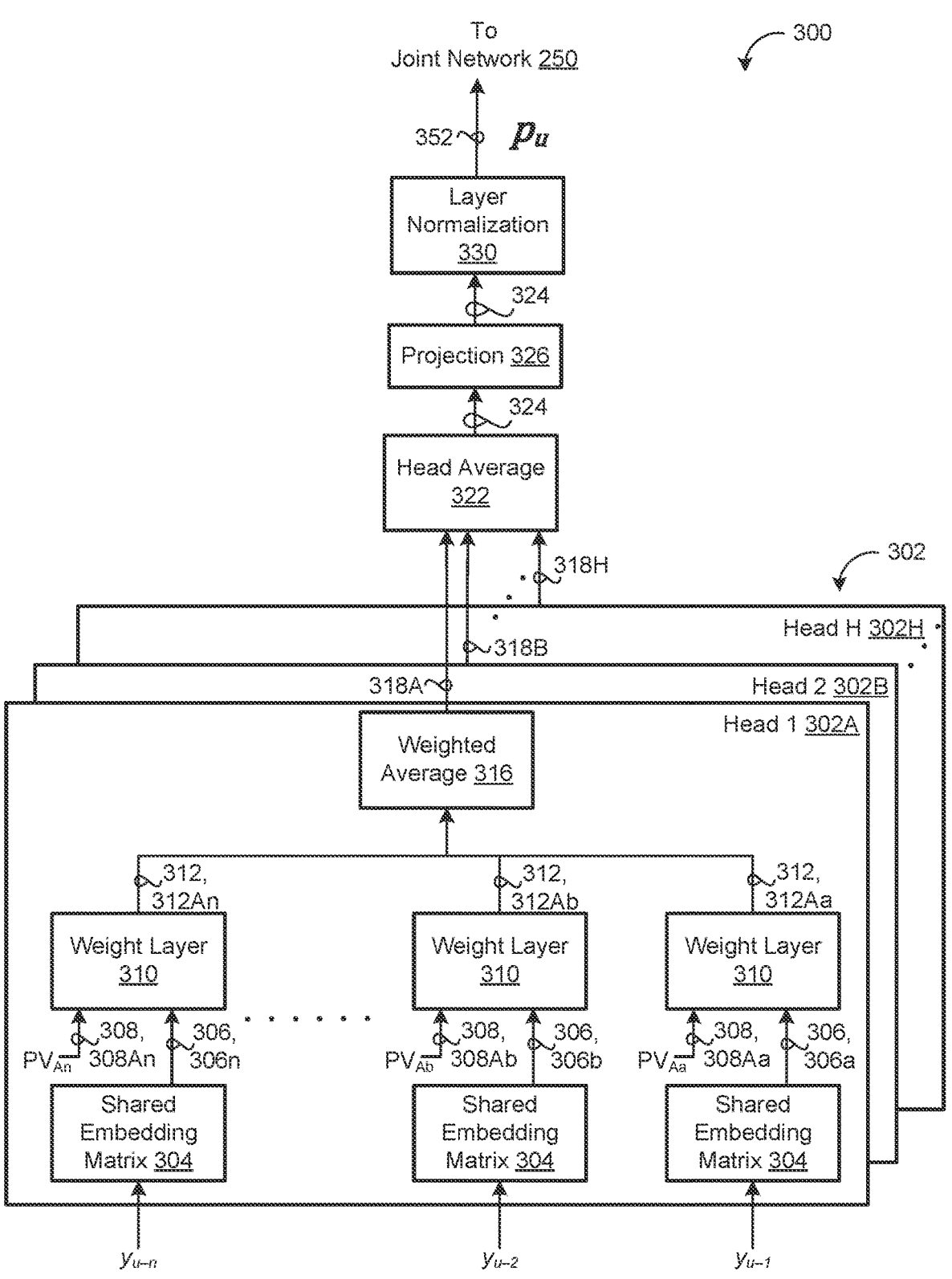
FIG. 3 is a schematic view of an example prediction network.

FIG. 3 shows the prediction network 300 for the RNN-T model 200 that receives, as input, a sequence of non-blank symbols $y_{u-n}, \ldots y_{u-1}$ that is limited to the N previous non-blank symbols output by the final softmax layer 260. In some examples, N is equal to two. In other examples, N is equal to five, however, the disclosure is non-limiting and N may equal any integer. The sequence of non-blank symbols may indicate a partial speech recognition result 120*a*, 120*b* (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism 302 improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306*a-n* (e.g., $X \in \mathbb{R}^{N \times d_e}$) for each non-blank symbol among the sequence of non-blank symbols $y_{ui-n}, \ldots, y_{ui-1}$ received as input at the corresponding output step from the plurality of output steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa\text{-}An}$ 308, 308Aa-An (e.g., $P \in \mathbb{R}^{H \times N \times d_e}$) to each corresponding non-blank symbol in the sequence of non-blank symbols $y_{u-n}, \ldots, y_{u-1}$. The respective position vector PV 308 assigned to each non-blank symbol indicates a position in the history of the sequence of non-blank symbols (e.g., the N previous non-blank symbols output by the final softmax layer 240). For instance, the first position vector $PV_{Aa}$ is assigned to a most recent position in the history, while the last position vector $PV_{An}$ is assigned to a last position in the history of the N previous non-blank symbols output by the final softmax layer 240. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols, $y_{u-n}, \ldots, y_{u-1}$, is the same at all of the heads 302A-H of the multi-headed attention mechanism 302, each head 302A-H defines a different set/row of position vectors 308. For instance, the first head 302A defines the row of position vectors $PV_{Aa\text{-}An}$ 308Aa-An, the second head 302B defines a different row of position vectors $PV_{Ba\text{-}Bn}$ 308$_{Ba\text{-}Bn}$, ..., and the $H^{th}$ head 302 H defines another different row of position vectors $PV_{Ha\text{-}Hn}$ 308$_{Ha\text{-}Hn}$.

For each non-blank symbol in the sequence of non-blank symbols received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_e (X_{n,e} * P_{h,n,e}) \qquad (1)$$

In Equation 1, h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $P_u$ 352 (i.e., hidden representation) at the corresponding output step from the plurality of output steps. The prediction network 300 generates only a single embedding vector $P_u$ 352 at each of the plurality of output steps subsequent to an initial output step.

In some configurations, the prediction network 300 does not implement the multi-headed attention mechanism 302 and only performs the operations described above with respect to the first head 302A. In these configurations, the weighted average 318A of the weighted embeddings 312Aa- An is simply passed through the projection layer 326 and layer normalization 330 to provide the single embedding vector $P_u$ 352.

Figure 4A:
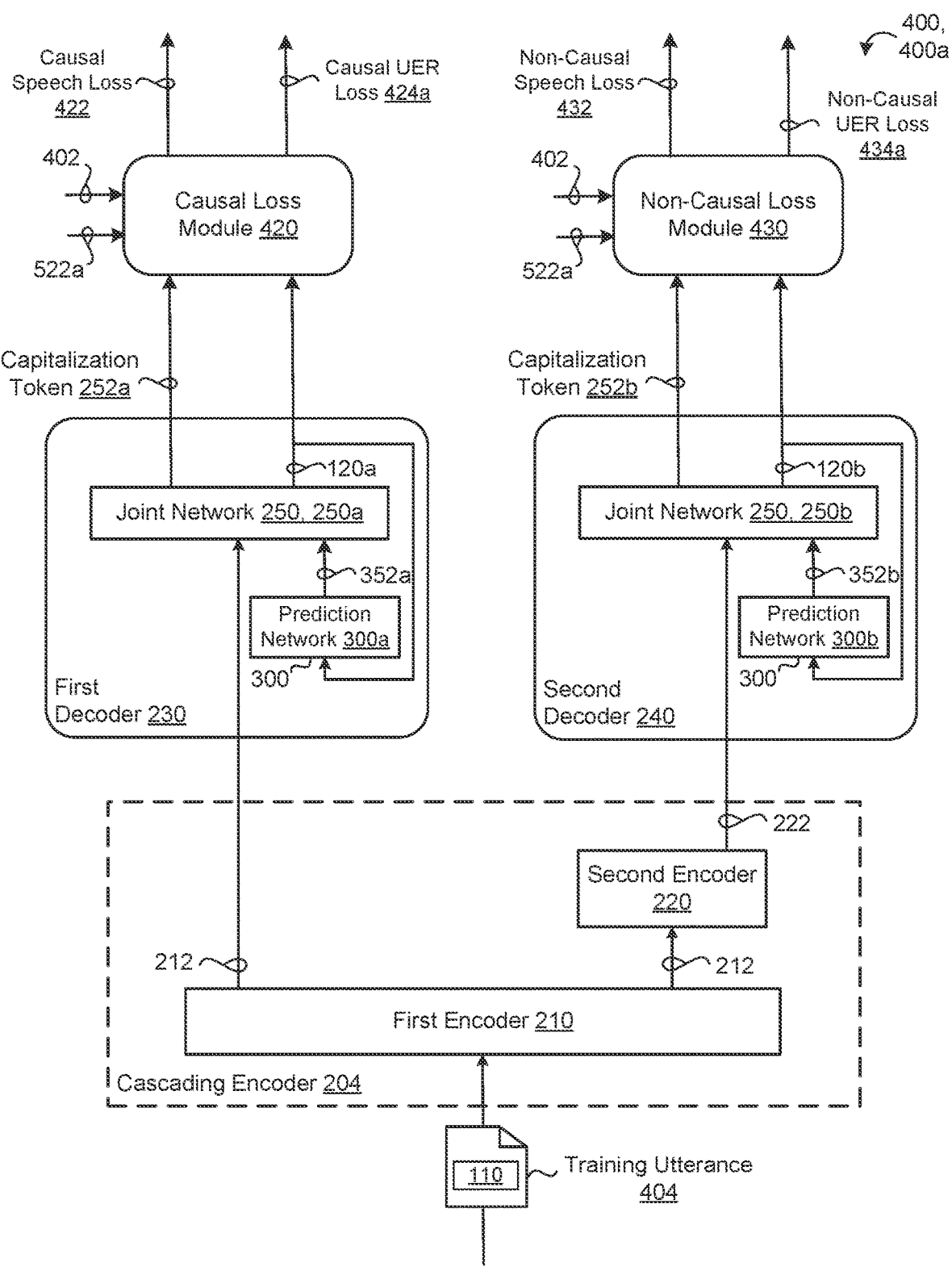
FIG. 4A is a schematic view of an example training process for training the speech recognition model for an auxiliary task of capitalization.
Figure 4B:
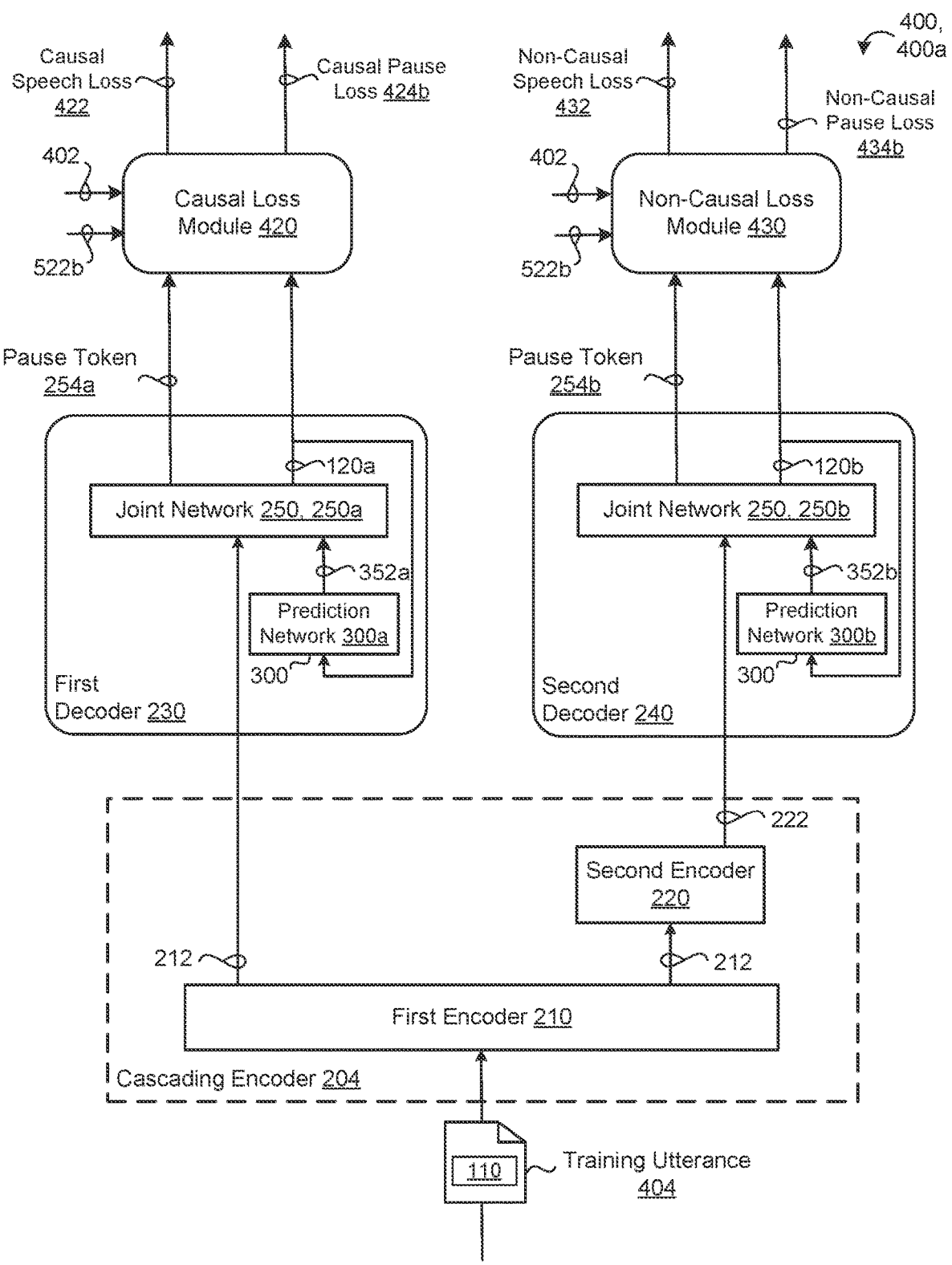
FIG. 4B is a schematic view of an example training process for training the speech recognition model for an auxiliary task of pause prediction.

Referring now to FIGS. 4A and 4B, in some implementations, a training process 400 jointly trains the ASR model 200 to perform speech recognition and one or more auxiliary tasks. The auxiliary tasks described herein include a capitalization task and a pause prediction task, however, the auxiliary tasks may also be included. Thus, the training process 400 trains the ASR model 200 jointly on speech recognition losses 422, 432 and auxiliary task losses 424, 434. Training the ASR model 200 may include updating parameters of any components of the ASR model 200 including, but not limited to, a cascading encoder 204 or decoders 230, 240 of the ASR model 200. As will become apparent, the training process 400 includes a first auxiliary task loss part 400, 400a (FIG. 4A) and a second auxiliary task loss part 400, 400b (FIG. 4B). The training process 400 may train the ASR model 200 using the first auxiliary task loss part 400a and/or the second auxiliary task loss part 400b. The training process 400 receives a training dataset 401 that includes one or more spoken training utterances 404 for training the ASR model 200. Each spoken training utterance 404 in the training dataset 401 includes a speech representation (e.g., synthetic or non-synthetic speech) and is paired with a corresponding transcription 402 and a corresponding target sequence of auxiliary tokens 522. That is, each respective spoken training utterances 404 may be characterized by a corresponding sequence of acoustic frames 110.

Figure 5A:
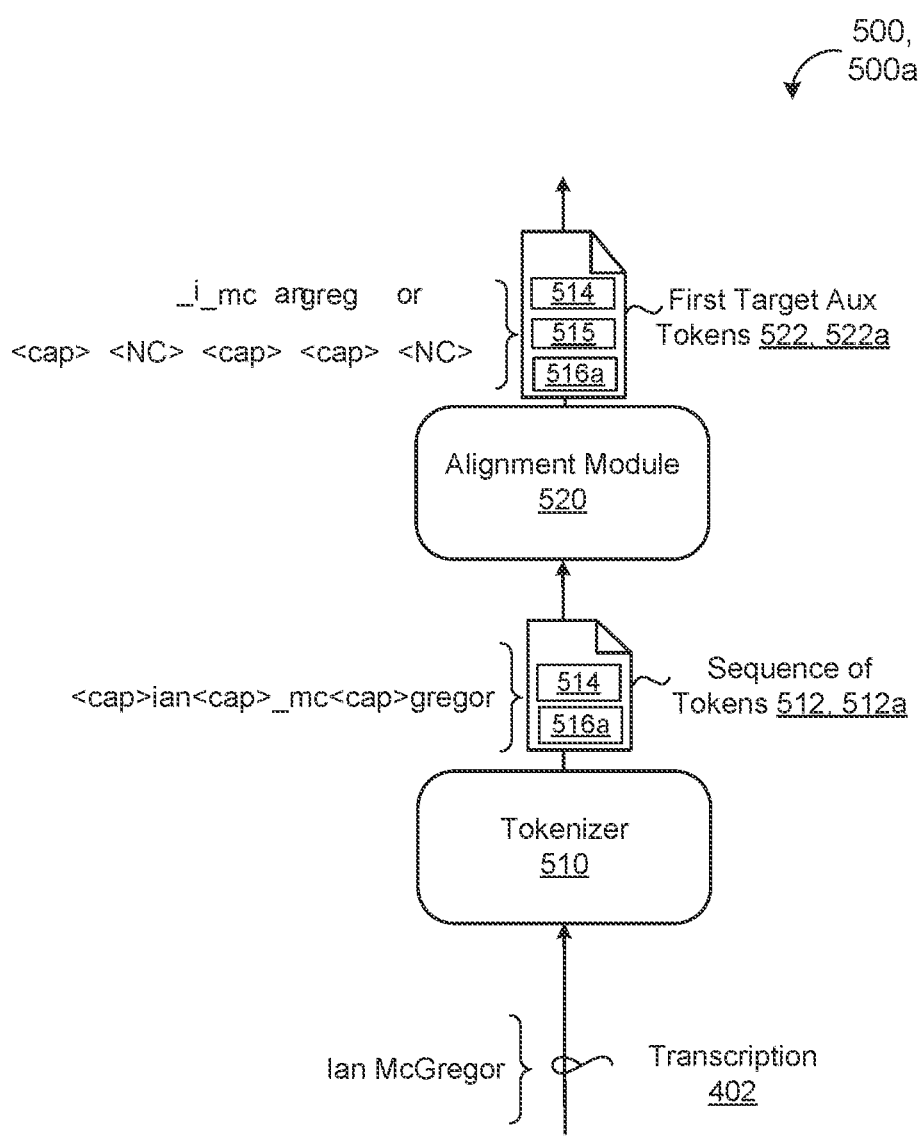
FIGS. 5A and 5B are schematic views of example generation process for generating a target sequence of auxiliary tokens.
Figure 5B:
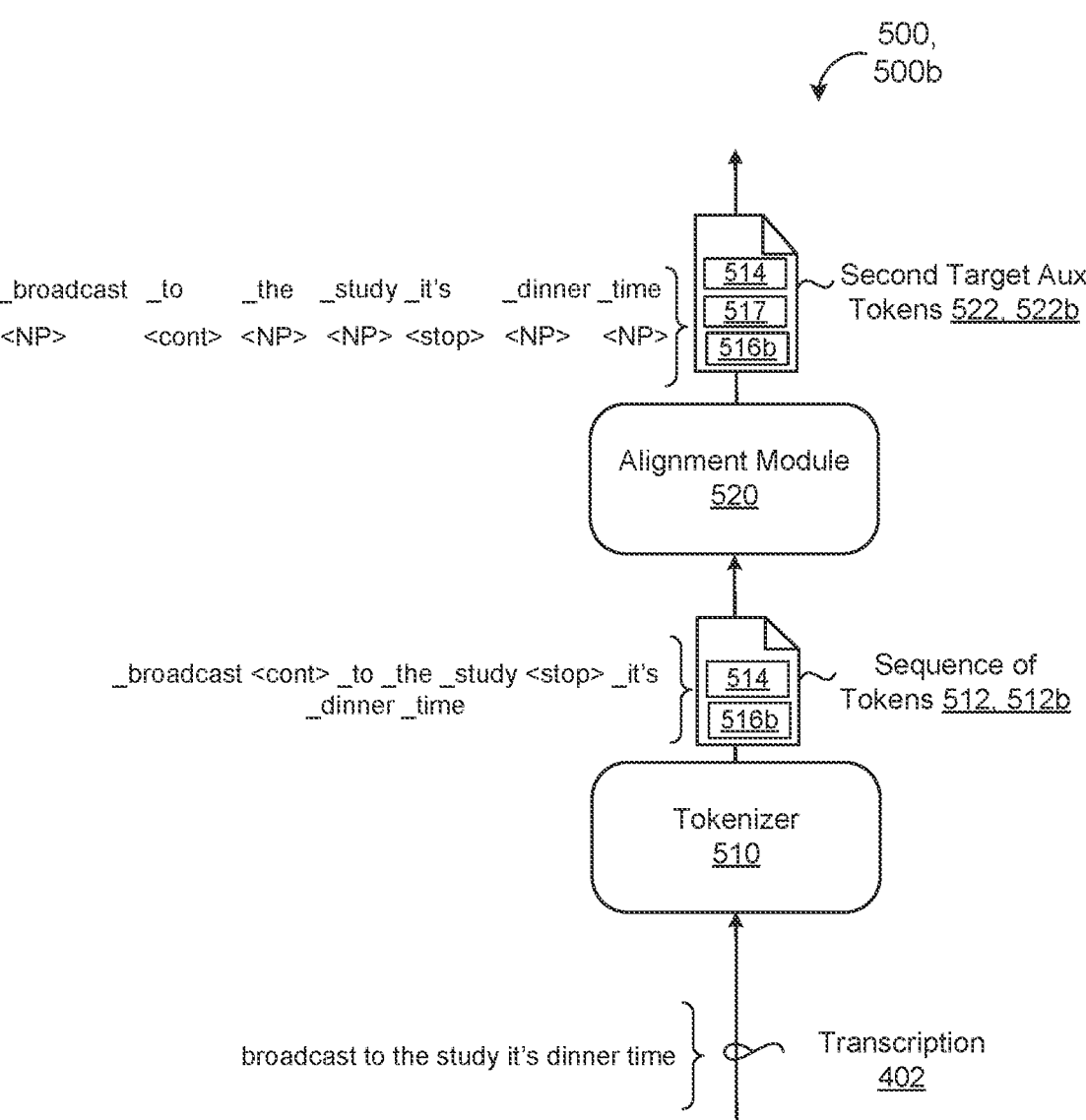

Referring now to FIGS. 5A and 5B, in some implementations, a target sequence generation process (i.e., generation process) 500 generates the target sequence of auxiliary tokens 522 used by the training process 400 (FIGS. 4A and 4B). In particular, a first generation process 500, 500a (FIG. 5A) generates a first target sequence of auxiliary tokens 522, 522a used by the first auxiliary task loss part 400a (FIG. 4A), and a second generation process 500, 500b (FIG. 5B) generates a second target sequence of auxiliary tokens 522, 522b used by the second auxiliary task loss part 400b (FIG. 4B). The generation process 500 employs a tokenizer 510 and an alignment module 520. The tokenizer 510 is configured to receive, as input, each respective transcription 402 and generate a corresponding sequence of tokens 512 for each respective transcription 402. The sequence of tokens 512 includes wordpiece tokens 514 and auxiliary tokens 516. The alignment module 520 is configured to receive, as input, each respective sequence of tokens 512 generated by the tokenizer 510 and generate a corresponding target sequence of auxiliary tokens 522. As will become apparent, the alignment module 520, generates the corresponding target sequence of auxiliary tokens by aligning the wordpiece tokens 514 with the auxiliary tokens 516.

Referring to FIG. 5A, during the first generation process 500a, the tokenizer 510 converts each respective uppercase letter of the transcription 402 into a corresponding lowercase letter and inserts a first auxiliary token (i.e., capitalization token) 516, 516a before each converted uppercase letter. Thereafter, the tokenizer 510 generates a first sequence of tokens 512, 512a by tokenizing the converted transcription (i.e., de-capitalized transcription) into a sequence of lowercase wordpieces whereby the tokenizer 510 tokenizes each inserted capitalization token 516a by itself. In the example shown, the tokenizer 510 converts the transcription 402 of "Ian McGregor" into lowercase letters of (i.e., "ian mcgregor") and inserts capitalization tokens 516a (i.e., "<cap>") before each converted uppercase letter. Finally, the tokenizer 510 generates the first sequence of tokens 512a of "<cap>ian<cap>_mc<cap>gregor" by tokenizing the converted transcription. Here, "<cap>" indicates the capitalization token 516a, "_" indicates a word boundary, and "ian," "mc," and "gregor" are all wordpiece tokens 514. Thereafter, the alignment module 520 generates a corresponding first target sequence of auxiliary tokens 522, 522a by aligning each capitalization token 516a with a corresponding wordpiece token 514. Moreover, the alignment module 520 may assign each wordpiece token 514 not aligned with any capitalization token 516a a non-capitalization token 515 (<NC>). Continuing with the example shown, the alignment module generates the corresponding first target sequence of auxiliary tokens 522a by the three capitalization tokens 516a with corresponding wordpiece tokens 514 of "i," "mc," and "gregor," and assigns the wordpiece tokens 514 of "an" and "or" the non-capitalization token 515. Thus, in the example shown, the first target sequence of auxiliary tokens 522a indicates that wordpiece tokens 514 of "i," "mc," and "gregor" should all begin with a capital letter and wordpieces 514 of "an" and "or" should not include capital letters.

Referring to FIG. 5B, during the first generation process 500b, the tokenizer 510 converts each transcription 402 into a sequence of wordpiece tokens 514 and inserts second auxiliary tokens (i.e., pause prediction tokens) 516, 516b into the sequence of wordpiece tokens 514. Each second auxiliary token 516b may include a continuation token ("<cont>") indicating that adjacent wordpiece tokens 514 are continuous (i.e., no pause is present between the adjacent wordpiece tokens) or a stop token ("<stop>") indicating there is a pause present between adjacent wordpiece tokens 514. In some examples, the tokenizer 510 determines the pause prediction tokens 516b based on the transcription 402. In other examples, the transcription 402 includes the pause prediction tokens 516b. For instance, each transcription 402 may be annotated by a human to indicate the pause prediction tokens 516b within each transcription 402. Finally, the tokenizer 510 generates a second sequence of tokens 512, 512b by tokenizing each wordpiece token 514 and each inserted pause prediction token 516b. In the example shown, the tokenizer generates the second sequence of tokens 512b of "_broadcast <cont>_to_the_study<stop>_it's_ dinner_ time" from the transcription 402 "broadcast to the study it's dinner time." Here, "_" indicates a word boundary. Thereafter, the alignment module 520 generates a corresponding second target sequence of auxiliary tokens 522, 522b by aligning each pause prediction token 516b with a corresponding wordpiece token 514. Notably, the alignment module 520 aligns each respective pause prediction token 516b to a wordpiece 514 that immediately precedes the respective pause prediction token 516b. Moreover, the alignment module 520 may assign each wordpiece token 514 not aligned with any pause prediction token 516b a non-pause token 517 (<NP>). Continuing with the example shown, the alignment module 520 generates the corresponding second target sequence of auxiliary tokens 522b by aligning pause prediction tokens 516b with wordpiece tokens 514 of "to" and "it's" and assigning the wordpieces 514 of "broadcast," "the," "study," "dinner," and "time" with the non-pause token 517.

Referring back to FIGS. 4A and 4B, in some implementations, the ASR model 200 includes a cascading encoder 204, a first decoder 230, and a second decoder 240. Here, the second decoder 240 is configured to improve upon initial speech recognition results 120a output by the first decoder 230. The first decoder 230 may operate in a streaming fashion such that the first decoder 230 is configured to generate partial speech recognition results corresponding to the initial speech recognition results 120a. On the other hand, the second decoder 240 improves upon the partial speech recognition results by receiving additional right-context and generating the final speech recognition results 120b. Notably, the use of two decoder 230, 240 is for operating in both the streaming and non-streaming fashion. Thus, when only operating in either the streaming or non-streaming mode, only a single one of the decoders 230, 240 may be employed. The first decoder 230 and the second decoder 240 each include a corresponding prediction network 300 followed by a corresponding joint network 250. More specifically, the first decoder 230 includes a first prediction network 300, 300a and a first joint network 250, 250a, and the second decoder 240 includes a second prediction network 300, 300b and a second joint network 250, 250b. The prediction networks 300a, 300b have a same structure that includes one of a long short-term memory (LSTM)-based prediction network or a V2 embedding look-up table. Similarly, the joint networks 250a, 250b of the first and second decoders 230, 240 have a same structure. However, even though the component structure is the same for the first decoder 230 and the second decoder 240, the respective components of each of the first and second decoders 230, 240 may be unique and trained independently from the components of the other one of the first and second decoders 230, 240.

The cascading encoder 204 refers to a model structure where the encoding pathway includes two encoders 210, 220 that cascade such that the output of a first encoder 210 feeds the input of a second encoder 220 prior to decoding. Here, the first encoder 210 and the second encoder 220 may be cascaded irrespective of the underlying architecture of each encoder. The encoders 210, 220 may each include a stack of multi-head self-attention layers. In some examples, the first encoder 210 includes a causal encoder having one of a plurality of unidirectional (LSTM) layers, a plurality of conformer layers, or a plurality of transformer layers. For example, the first encoder 210 may include nine (9) conformer layers each having a multi-headed (e.g., eight (8) heads) self-attention mechanism and a convolutional kernel size of fifteen (15). Moreover, the first encoder 210 may perform a concatenation operation after a third conformer layer to achieve a time reduction rate of two whereby the resulting 1024-dimensional vectors are transformed by a fourth conformer layer and then projected back to a 512-dimensional vector using another linear transformation. Thereafter, another eight (5) conformer layers are followed by a final normalization layer. Thus, the first encoder 210 may include 57 million parameters. Each layer of the first encoder 210 receives zero right-context (e.g., receives zero future acoustic frames).

The second encoder 220 includes a non-causal encoder having one of one or more bi-directional LSTM layers, a plurality of conformer layers, or a plurality of transformer layers. For instance, the second encoder 220 may include six (6) conformer layers of 640-dimensions and a final linear normalization layer thereby resulting in 117 million parameters. The second encoder 220 may receive additional right-context, for example a total of 15-right context frames across all layers to provide 900 milliseconds of additional right context.

With continued reference to FIGS. 4A and 4B, the first encoder 210 receives a sequence of d-dimensional feature vectors (e.g., sequence of acoustic frames 110) $x = (x_1, x_2, \ldots, x_T)$, where $x_t \in \mathbb{R}^d$. Here, each sequence of acoustic frames 110 characterizes one or more of the spoken training utterances 404 such that the first encoder 210 receives a respective sequence of acoustic frames 110 for each spoken training utterance 404. Thus, the first encoder 210 generates, at each output step of a plurality of output steps, a first higher order feature representation 212 for a corresponding acoustic frame 110 in the sequence of acoustic frames 110. Similarly, the second encoder 220 is connected in cascade to the first encoder 210 and receives, as input, the first higher order feature representation 212 and generates, at each output step, a second higher order feature representation 222 for a corresponding first higher order feature representation 212. In some instances, the second encoder 220 generates the second higher order feature representation 222 without receiving any of the acoustic frames 110 as input. In these instances, the second encoder 220 generates the second higher order feature representations 222 using only the first higher order feature representation 212 as input. That is, the first higher order feature representations 212 received from the first encoder 210 serve as the additional right-context. The first encoder 210 outputs the first higher order feature representations 212 to the second encoder 220 and the first decoder 230 while the second encoder 220 outputs the second higher order feature representations 212 to the second decoder 240. Thus, the cascading encoder 204 output may be represented by:

$$f(X) = [f_0, \ldots, f_{T-1}] \qquad (2)$$

With continued reference to FIGS. 4A and 4B, the first decoder 230 includes the first joint network 250a and the first prediction network 300a. The first joint network 250a is configured to receive, as input, a first dense representation 352a generated by the first prediction network 300a and the first higher order feature representation 212 generated by the first encoder 210 and generate, at each output step, an initial speech recognition hypothesis 120a for a corresponding acoustic frame 110. Thus, the first joint network 250a generates the initial speech recognition hypothesis 120a based on the first higher order feature representation 212 and the first dense representation 352a. Each wordpiece from the initial speech recognition hypothesis 120a may include a word, wordpiece, phoneme, and/or grapheme. Notably, the first joint network 250a generates the initial speech recognition hypothesis 120a using lowercase wordpieces (i.e., lowercase letters or wordpieces having lowercase letters). Thus, each letter from the initial speech recognition result 120a includes only lower case letters. Advantageously, by generation speech recognition hypotheses 120 with only lowercase letters, the joint network 250 may generate N-best speech recognition hypotheses corresponding to different words or terms. That is, because the N-best hypotheses do not include the same words with different capitalization, the N-best hypotheses include more possible hypotheses for the spoken utterance. The first decoder 230 operates in the streaming fashion such that the first decoder 230 generates the initial speech recognition results 120a that may correspond to partial speech recognition results.

The first prediction network 300a receives, as input, a first sequence of non-blank symbols output by the first decoder 230 and generates, at each output step, the first dense representation 352a. In particular, the first prediction network 300a may receive the sequence of non-blank symbols from a final softmax layer of the first decoder 230. Here, the sequence of non-blank symbols corresponds to the speech recognition hypothesis 120 with blank tokens removed.

The second decoder 240 includes the second joint network 250b and the second prediction network 300b. In some configurations, the second joint network is configured to receive, as input, a second dense representation 352b generated by the second prediction network 300b and the second higher order feature representation 222 generated by the second encoder 220 and generate, at each output step, a final speech recognition result 120b for a corresponding acoustic frame 110. Thus, the second joint network 250b generates the final speech recognition result 120b based on the second higher order feature representation 222 and the second dense representation 352b. Notably, the second joint network 250b generates the final speech recognition result 120b using lowercase wordpieces (i.e., lowercase letters or wordpieces having lowercase letters). Thus, each letter from the final speech recognition result 120b includes only lower case letters. The second decoder 240 operates in the streaming fashion such that the second decoder 240 generates the final speech recognition results 120b that may correspond to partial speech recognition results.

The second prediction network 300b receives, as input, a second sequence of non-blank symbols output by the second decoder 240 and generates, at each output step, the second dense representation 352b. In particular, the second prediction network 300b may receive the sequence of non-blank symbols from a final softmax layer of the first decoder 240. Here, the sequence of non-blank symbols corresponds to the speech recognition hypothesis 120 with blank tokens removed. Thus, the first and second dense representations 352b may be represented by:

$$g(Y) = [g_0, \ldots, g_{U-1}] \qquad (3)$$

In some implementations, speech recognition hypothesis 120 output by the joint network 250 includes a probability distribution over possible speech recognition hypotheses. More specifically, the initial speech recognition hypothesis 120a may include an initial probability distribution over possible speech recognition hypotheses and the final speech recognition hypothesis 120b may include a final probability distribution over possible speech recognition hypotheses. Thus, the initial speech recognition hypothesis 120a may be used interchangeably with the initial probability distribution over possible speech recognition hypotheses and the final speech recognition hypothesis may be used interchangeably with the final probability distribution over possible speech recognition hypotheses. Here, the "possible speech recognition hypotheses" of the initial probability distribution 120a and the final probability distribution 120b correspond to a set of output labels/symbols (also referred to as "speech units") each representing a grapheme (symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 250 may output a set of values indicative of the likelihood of occurrence of each of a predetermined set of output labels. The set of values can be a vector (e.g., a one-hot vector) and can indicate a probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The probability distributions output by the joint network 250 can include a posterior probability value for each of the different output labels. Thus, if there are 100 different output labels representing different graphemes or other symbols, the output of the joint network 250 can include 100 different probability values, one for each output label. The probability distributions can then be used to select and assign scores to candidate orthographic elements (e.g., graphemes, word-pieces, and/or words) in a beam search process (e.g., by a final Softmax layer) for determining the speech recognition hypothesis 120. For example, the joint network 250 may select the N-best possible speech recognition hypotheses having the highest probabilities as output.

Thus, the first and second joint networks 250a, 250b fuse audio features extracted by the cascading encoder 204 with language model features extracted by the first and second prediction networks 300a, 300b. Here, the input utterance ASR model 200 receives an input utterance (X) with and generates a label sequence (Y) to an ASR output space ( $\mathcal{Y}$ ). The ASR output space includes a special blank token indicating non-emission and a set of (V−1) non-blank output tokens (i.e., $\mathcal{Y} = y^0 = \text{<blank>}, y^1, \ldots, y^{V-1}$). Moreover, the first and second joint networks 250a, 250b include a first projection and sum operation to determine hidden activations according to:

$$h_{t,u} = P \cdot f_t + Q \cdot g_u + b_n \tag{4}$$

Followed by a non-linear activation represented by:

$$s_{t,u} = A \cdot \tanh(h_{t,u}) + b_s \tag{5}$$

In Equation 5, $s_{t,u}$ represents logits for determining probabilities over the output vocabulary. In some examples, the joint network 250 uses factorized distribution over <blank> versus non-blank symbols to determine the probability of non-emission according to:

$$b_{t,u} := P_{t,u}(\text{<blank>}|f_{0:t}, g_{0:u}) = \sigma(s_{t,u}[0]) \tag{6}$$

In Equation 6, $\sigma(x) = 1/(1 + \exp(-x))$ represents the sigmoid activation. Thus, applying softmax activation to the remaining dimensions to determine the distribution over wordpiece tokens conditioned on the emission event is represented by:

$$P_{t,u}(y^y | f_{0:t}, g_{0:u}) = (1 - b_{t,u}) \cdot P_{t,u}(y^y | \text{emission}, f_{0:t}, g_{0:u}) \tag{7}$$

$$= (1 - b_{t,u}) \cdot (\text{softmax}(s_{t,u}[1:])[v - 1])$$

Referring now specifically to FIG. 4A, during the first auxiliary task loss part 400a of the training process 400 the first joint network 250a is further configured to generate, at each output step, an initial predicted auxiliary token (i.e., initial predicted capitalization token) 252, 252a for the corresponding acoustic frame 110 based on the first higher order feature representation 212 and the first dense representation 352a. That is, at each output step that the first joint network 250a outputs a respective initial speech recognition hypothesis 120a, the first joint network 250 also generates a corresponding initial predicted capitalization token 252a for the respective initial speech recognition hypothesis 120a. Simply put, the first joint network 250a generates the initial speech recognition hypotheses 120a and the initial predicted capitalization tokens 252a synchronously. The initial predicted capitalization token 252a may include at least one of a blank token, a non-capitalization (NC) token, or a capitalization (cap) token. The blank token indicates that the first joint network 250a did not output any initial speech recognition hypothesis 120a at the corresponding output step (e.g., output a blank token), the non-capitalization token indicates that the respective initial speech recognition hypothesis is not capitalized, and the capitalization token indicates that the respective initial speech recognition hypothesis 120a is capitalized. As such, each corresponding initial predicted capitalization token 252a output by the first joint network 250a indicates whether the respective initial speech recognition hypothesis 120a output at a the same corresponding output step should be capitalized or not. In some examples, the first joint network 250a shares blank tokens between the initial speech recognition hypothesis 120a and the initial predicted capitalization tokens 252a.

A causal loss module 420 is configured to receive, as input, the initial speech recognition hypothesis 120a generated by the first joint network 250a for the corresponding spoken training utterance 404 and the corresponding transcription 402 and determine a causal speech recognition loss 422 based on the initial speech recognition hypothesis 120a and the corresponding transcription 402. Notably, the causal loss module 420 does not consider capitalization of letters in the transcription 402 or the initial speech recognition hypothesis 120a when determining the causal speech recognition loss 422 and only considers whether the letters and/or wordpieces match regardless of capitalization. Moreover, the causal loss module 420 is configured to receive, as input, the initial predicted capitalization token 252a and determine a first causal auxiliary task loss 424, 424a based on the initial predicted capitalization token 252a and the corresponding first sequence of target auxiliary tokens 522a. That is, the causal loss module 420 may compare initial predicted capitalization token 252a to corresponding first sequence of target auxiliary tokens 522a to determine whether the first joint network 250a correctly generated the initial predicted capitalization token 252a for the respective initial speech recognition hypothesis generated at the same output step.

With continued reference to FIG. 4A, similar to the first joint network 250a, the second joint network 250b is further configured to generate, at each output step, an final predicted auxiliary token (i.e., final predicted capitalization token) 252, 252b for the corresponding acoustic frame 110 based on the second higher order feature representation 222 and the second dense representation 352b. That is, at each output step that the second joint network 250b outputs a respective final speech recognition hypothesis 120a, the second joint network 250b also generates a corresponding final predicted capitalization token 252b for the respective final speech recognition hypothesis 120b. Simply put, the second joint network 250b generates the final speech recognition hypotheses 120b and the final predicted capitalization tokens 252b synchronously. The final predicted capitalization token 252b may also include at least one of a blank token, a non-capitalization (NC) token, or a capitalization (cap) token. As such, each corresponding final predicted capitalization token 252b output by the second joint network 250b indicates whether the respective final speech recognition hypothesis 120b output at the same corresponding output step should be capitalized or not. In some examples, the second joint network 250b shares blank tokens between the final speech recognition hypothesis 120b and the final predicted capitalization tokens 252b.

A non-causal loss module 430 is configured to receive, as input, the final speech recognition hypothesis 120b generated by the second joint network 250b for the corresponding spoken training utterance 404 and the corresponding transcription 402 and determine a non-causal speech recognition loss 432 based on the final speech recognition hypothesis 120b and the corresponding transcription 402. Notably, the non-causal loss module 430 does not consider capitalization of letters in the transcription 402 or the final speech recognition hypothesis 120*b* when determining the non-causal speech recognition loss 422 and only considers whether the letters and/or wordpieces match regardless of capitalization. Moreover, the non-causal loss module 430 is configured to receive, as input, the final predicted capitalization token 252*b* and determine a first non-causal auxiliary task loss 434, 434*a* based on the final predicted capitalization token 252*b* and the corresponding first sequence of target auxiliary tokens 522*a*. That is, the non-causal loss module 430 may compare final predicted capitalization token 252*b* to corresponding first sequence of target auxiliary tokens 522*a* to determine whether the second joint network 250*b* correctly generated the final predicted capitalization token 252*b* for the respective final speech recognition hypothesis 120*b* generated at the same output step.

The first auxiliary loss part 400*a* of the training process 400 trains the ASR model 200 jointly on the speech recognition losses 422, 432 and the first auxiliary task losses 424*a*, 434*a* determined for each spoken training utterance 404 in the training dataset 401. In some examples, the speech recognition losses 422, 432 may include a minimum word error rate (MWER) loss by comparing N-best speech recognition hypotheses 120 to the transcription 402. The first auxiliary task losses 424*a*, 434*a* may include an uppercase error rate (UER) loss. After the first auxiliary loss part 400*a* trains the ASR model 200, the ASR model 200, during inference, may use the predicted capitalization tokens 252 to capitalize letters of the speech recognition hypothesis 120 to accurately generate transcriptions for audio input that accurately transcribe speech with correct capitalization.

Referring now specifically to FIG. 4B, during the second auxiliary task loss part 400*b* of the training process 400 the first joint network 250*a* is further configured to generate, at each output step, an initial predicted auxiliary token (i.e., initial pause prediction token) 254, 254*a* for the corresponding acoustic frame 110 based on the second higher order feature representation 222 and the second dense representation 352*b*. That is, at each output step that the first joint network 250*a* outputs a respective final speech recognition hypothesis 120*a*, the first joint network 250*a* also generates a corresponding initial pause predicting token 254*a*. In contrast, to the first auxiliary loss part 400*a* (FIG. 4A), the first joint network 250*a* may generate the initial pause prediction tokens 254*a* synchronously or asynchronously with the initial speech recognition hypotheses 120*a*. That is, the first joint network 250*a* may generate the initial pause prediction tokens 254*a* after initial speech recognition hypotheses 120*a*. The initial pause prediction token 254*a* may include at least one of a blank token, a non-pause (NP) token, a pause/stop token, or a continuation (cont) token. The blank token indicates that the first joint network 250*a* did not output any initial speech recognition hypothesis 120*a* at the corresponding output step (e.g., output a blank token), the non-pause token indicates that no pause is present at the corresponding output step, the stop token indicates that a pause is present at the corresponding output step, and the continuation token indicates that the speech is continuing at the corresponding output step. As such, each corresponding initial pause prediction token 254*a* output by the first joint network 250*a* indicates whether a pause is present (or not present) at a corresponding acoustic frame 110 in the sequence of acoustic frames 110 that characterizes the spoken raining utterance 404.

The causal loss module 420 is configured to receive, as input, the initial speech recognition hypothesis 120*a* generated by the first joint network 250*a* for the corresponding spoken training utterance 404 and the corresponding transcription 402 and determine the causal speech recognition loss 422 based on the initial speech recognition hypothesis 120*a* and the corresponding transcription 402. Moreover, the causal loss module 420 is configured to receive, as input, the initial pause prediction token 254*a* and determine a second causal auxiliary task loss 424, 424*b* based on the initial pause prediction token 254*a* and the corresponding second sequence of target auxiliary tokens 522*b*. That is, the causal loss module 420 may compare initial pause prediction token 254*a* to corresponding the second sequence of target auxiliary tokens 522*b* to determine whether the first joint network 250*a* correctly generated the initial pause prediction token 254*a* at the corresponding output step.

With continued reference to FIG. 4B, similar to the first joint network 250*a*, the second joint network 250*b* is further configured to generate, at each output step, a final predicted auxiliary token (i.e., final pause prediction token) 254, 254*b* for the corresponding acoustic frame 110 based on the second higher order feature representation 222 and the second dense representation 352*b*. That is, at each output step that the second joint network 250*b* outputs a respective final speech recognition hypothesis 120*b*, the second joint network 250*b* also generates a corresponding final pause prediction token 254*b*. In contrast, to the first auxiliary loss part 400*a* (FIG. 4A), the second joint network 250*b* may generate the final pause prediction tokens 254*b* synchronously or asynchronously with the final speech recognition hypotheses 120*b*. That is, the second joint network 250*b* may generate the final pause prediction tokens 254*b* after the final speech recognition hypotheses 120*b*. The final pause prediction token 254*b* may also include at least one of a blank token, a non-pause (NP) token, a pause/stop token, or a continuation (cont) token. As such, each corresponding final pause prediction token 254*b* output by the second joint network 250*b* indicates whether a pause is present (or not present) at a corresponding acoustic frame 110 in the sequence of acoustic frames 110 that characterizes the spoken raining utterance 404.

The non-causal loss module 430 is configured to receive, as input, the final speech recognition hypothesis 120*b* generated by the second joint network 250*b* for the corresponding spoken training utterance 404 and the corresponding transcription 402 and determine the non-causal speech recognition loss 432 based on the final speech recognition hypothesis 120*b* and the corresponding transcription 402. Moreover, the non-causal loss module 430 is configured to receive, as input, the final pause prediction token 254*b* and determine a second non-causal auxiliary task loss 434, 434*b* based on the final pause prediction token 254*b* and the corresponding second sequence of target auxiliary tokens 522*b*. That is, the non-causal loss module 430 may compare final pause prediction token 254*b* to corresponding the second sequence of target auxiliary tokens 522*b* to determine whether the second joint network 250*b* correctly generated the final pause prediction token 254*b* at the corresponding output step.

The second auxiliary loss part 400*b* of the training process 400 trains the ASR model 200 jointly on the speech recognition losses 422, 432 and the second auxiliary task losses 424*b*, 434*b* determined for each spoken training utterance 404 in the training dataset 401. In some examples, the speech recognition losses 422, 432 may include a minimum word error rate (MWER) loss by comparing N-best speech recognition hypotheses 120 to the transcription 402. The second auxiliary task losses 424*a*, 434*a* may include a pause prediction loss. After the second auxiliary loss part 400*b* trains the ASR model 200, the ASR model 200, during inference, may use the predicted pause prediction tokens 254 to predict pauses within the speech recognition hypothesis.

As described above, the ASR model 200 employs joint networks 250 that generate multiple outputs, namely, speech recognition hypothesis 120 and auxiliary tokens 252, 254. In some examples, the joint networks 250 use a respective last linear layer for each auxiliary task. That is, for the capitalization task the joint networks 250 use a first last linear layer and for the pause prediction task the joint networks 250 use a second last linear layer. Advantageously, by using multiple outputs from the joint networks 250, the ASR model 200 may jointly train to learn speech recognition tasks in addition to auxiliary tasks. Moreover, because the speech recognition hypotheses 120 and the auxiliary tokens 252, 254 are output separately such that the auxiliary tokens 252, 254 are not fed to the prediction network 300, generating the auxiliary tokens 252, 254 does not degrade performance of the speech recognition task for the ASR model 200.

Figure 6:
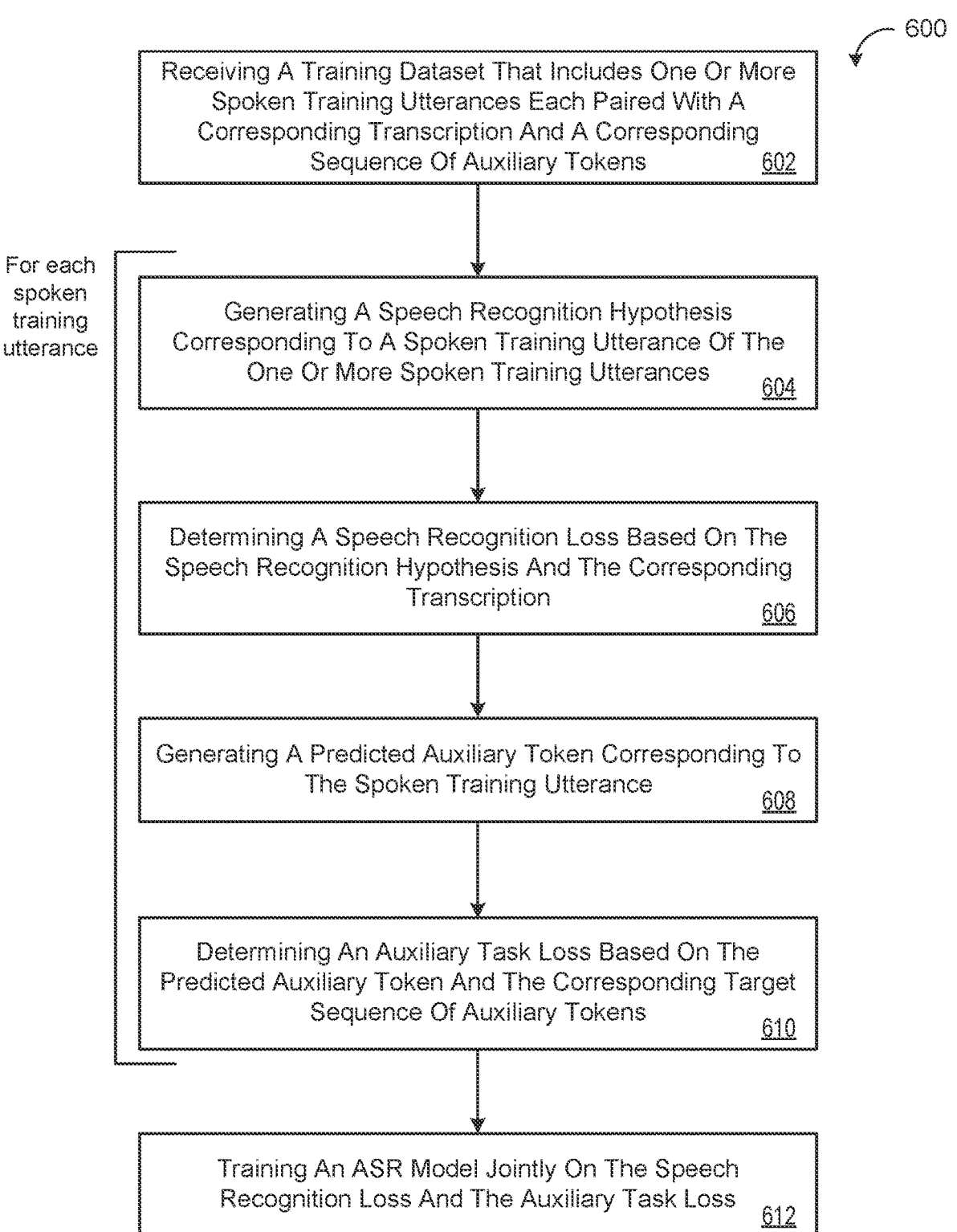
FIG. 6 is a flowchart of an example arrangement of operations for a computer-implemented method of training a multi-output joint network for multi-task learning.
Figure 7:
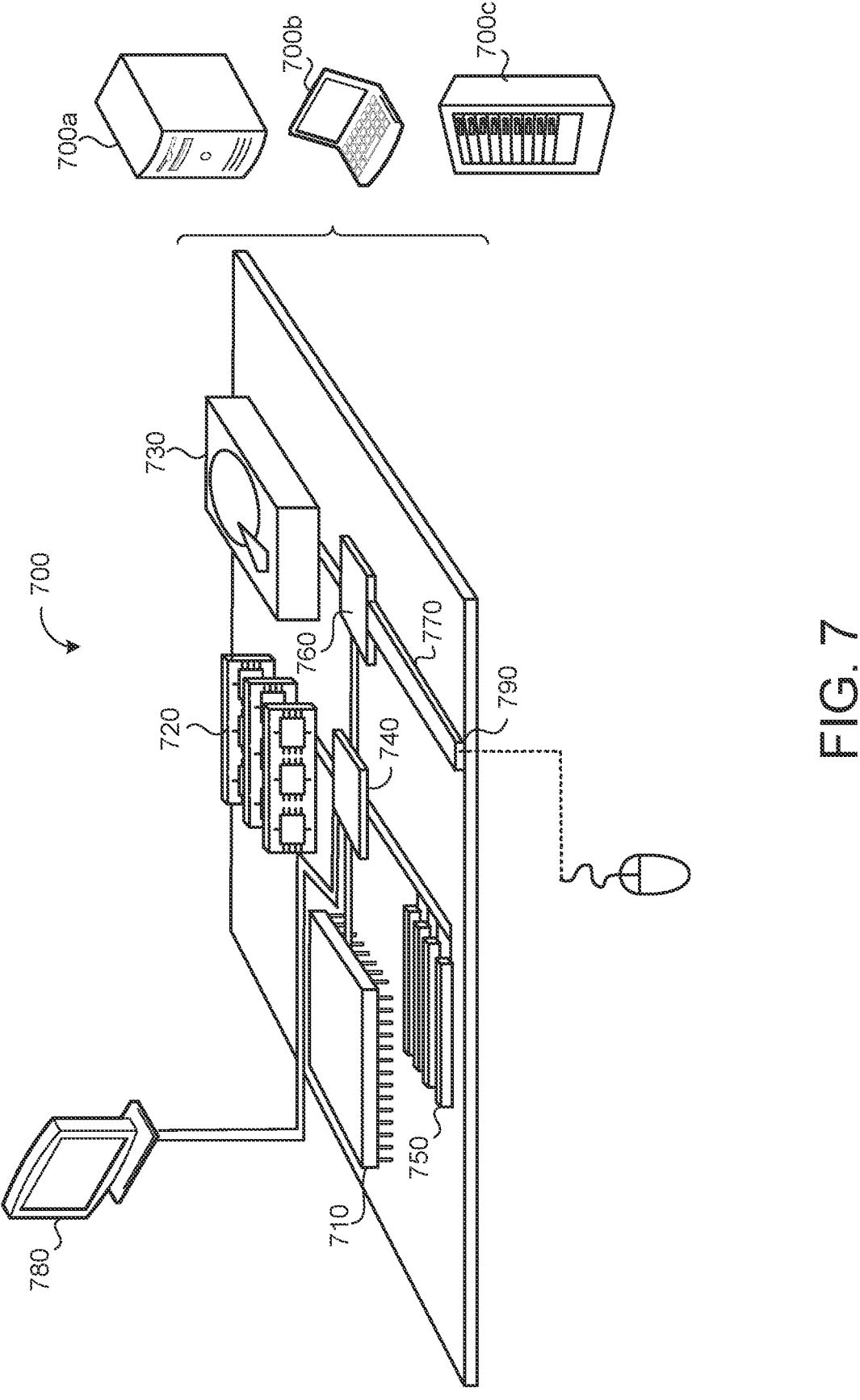
FIG. 7 is a schematic view of an example computing device that may be used to implement the systems and methods described herein.

FIG. 6 is a flowchart of an example arrangement of operations for a computer-implemented method 600 of multi-task learning for speech recognition and auxiliary tasks. The method 600 may execute on data processing hardware 710 (FIG. 7) using instructions stored on memory hardware 720 (FIG. 7). The data processing hardware and the memory hardware 720 may reside on the user device 10 and/or the remote computing device 60 of FIG. 1 each corresponding to a computing device 700 (FIG. 7).

At operation 602, the method 600 includes receiving a training dataset 301 that includes one or more spoken training utterances 404 for training an automatic speech recognition (ASR) model 200. Each spoken training utterance 404 in the training dataset 401 is paired with a corresponding transcription 402 and a corresponding target sequence of auxiliary tokens 522. For each spoken training utterance 404 of the one or more spoken training utterances 404, the method 600 performs operations 604-610. At operation 604, the method 600 includes generating, by a joint network 250 of the ASR model 200, a speech recognition hypothesis 120 for a corresponding spoken training utterance 404 of the one or more spoken training utterances 404. At operation 606, the method 600 includes determining a speech recognition loss 422, 432 based on the speech recognition hypothesis 120 generated by the joint network 250 for the corresponding spoken training utterance 404 and the corresponding transcription 402. At operation 608, the method 600 includes generating, by the joint network 250 of the ASR model 200, a predicted auxiliary token 252, 254 for the corresponding spoken training utterance 404 of the one or more spoken training utterances 404. At operation 610, the method 600 includes determining an auxiliary task loss 424, 434 based on the predicted auxiliary token 252, 254 generated by the joint network 250 for the corresponding spoken training utterance 404 and the corresponding target sequence of auxiliary tokens 522. At operation 612, the method 600 includes training the ASR model 200 jointly on the speech recognition loss 422, 432 and the auxiliary task loss 424, 434 determined for each spoken training utterance 404.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/ controller 740 connecting to the memory 720 and high-speed expansion ports 750, and a low speed interface/ controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

receiving a training dataset comprising one or more spoken training utterances for training an automatic speech recognition (ASR) model, each spoken training utterance in the training dataset paired with a corresponding transcription and a corresponding target sequence of auxiliary tokens;

for each corresponding transcription:

converting each uppercase letter of the corresponding transcription into a corresponding lowercase letter;

inserting capitalization tokens before each converted uppercase letter;

tokenizing the converted transcription into a sequence of tokens comprising wordpiece tokens and the capitalization tokens; and generating the corresponding target sequence of auxiliary tokens by aligning each capitalization token with a corresponding one of the wordpiece tokens;

for each spoken training utterance of the one or more spoken training utterances:

generating, by a decoder of the ASR model, a speech recognition hypothesis for a corresponding spoken training utterance of the one or more spoken training utterances;

determining a speech recognition loss based on the speech recognition hypothesis generated by the decoder for the corresponding spoken training utterance and the corresponding transcription;

generating, by the decoder of the ASR model, a predicted auxiliary token for the corresponding spoken training utterance of the one or more spoken training utterances; and determining an auxiliary task loss based on the predicted auxiliary token generated by the decoder for the corresponding spoken training utterance and the corresponding target sequence of auxiliary tokens; and training the ASR model jointly on the speech recognition loss and the auxiliary task loss determined for each spoken training utterance.

2. The computer-implemented method of claim 1, wherein the ASR model comprises:

a causal encoder configured to:

receive, as input, a sequence of acoustic frames characterizing each of the one or more spoken training utterances; and generate, at each of a plurality of output steps, a first higher order feature representation for a corresponding acoustic frame in the sequence of acoustic frames;

a first prediction network configured to:

receive, as input, a first sequence of non-blank symbols output by a final softmax layer; and generate, at each of the plurality of output steps, a first dense representation; and a first joint network configured to:

receive, as input, the first higher order feature representation generated by the causal encoder at each of the plurality of output steps and the first dense representation by the first prediction network at each of the plurality of output steps; and generate, at each of the plurality of output steps, an initial speech recognition hypothesis and an initial predicted auxiliary token.

3. The computer-implemented method of claim 2, wherein the ASR model comprises:

a non-causal causal encoder configured to:

receive, as input, the first higher order feature representation generated by the causal encoder at each of the plurality of output steps; and generate, at each of a plurality of output steps, a second higher order feature representation for a corresponding first higher order feature representation;

a second prediction network configured to:

receive, as input, a second sequence of non-blank symbols output by the final softmax layer; and generate, at each of the plurality of output steps, a second dense representation; and a second joint network configured to:

receive, as input, the second higher order feature representation generated by the non-causal encoder at each of the plurality of output steps and the second dense representation generated by the second prediction network at each of the plurality of output steps; and generate, at each of the plurality of output steps, a final speech recognition hypothesis and a final predicted auxiliary token.

4. The computer-implemented method of claim 1, wherein the decoder generates the speech recognition hypothesis and the predicted auxiliary token synchronously.

5. The computer-implemented method of claim 1, wherein the decoder generates the speech recognition hypothesis and the predicted auxiliary token asynchronously.

6. The computer-implemented method of claim 1, wherein the predicted auxiliary token comprises a capitalization token or a non-capitalization token.

7. The computer-implemented method of claim 6, wherein the auxiliary task loss comprises an uppercase error rate loss.

8. The computer-implemented method of claim 1, wherein the predicted auxiliary token comprises at least one of:

a non-pause token;

a stop token; or a continuation token.

9. The computer-implemented method of claim 8, wherein the auxiliary task loss comprises a pause prediction loss.

10. A system comprising:

data processing hardware; and memory hardware in communication with the data processing hardware, the memory hardware storing instructions that when executed on the data processing hardware cause the data processing hardware to perform operations comprising:

receiving a training dataset comprising one or more spoken training utterances for training an automatic speech recognition (ASR) model, each spoken training utterance in the training dataset paired with a corresponding transcription and a corresponding target sequence of auxiliary tokens;

for each corresponding transcription:

converting each uppercase letter of the corresponding transcription into a corresponding lowercase letter;

inserting capitalization tokens before each converted uppercase letter;

tokenizing the converted transcription into a sequence of tokens comprising wordpiece tokens and the capitalization tokens; and generating the corresponding target sequence of auxiliary tokens by aligning each capitalization token with a corresponding one of the wordpiece tokens;

for each spoken training utterance of the one or more spoken training utterances:

generating, by a decoder of the ASR model, a speech recognition hypothesis for a corresponding spoken training utterance of the one or more spoken training utterances;

determining a speech recognition loss based on the speech recognition hypothesis generated by the decoder for the corresponding spoken training utterance and the corresponding transcription;

generating, by the decoder of the ASR model, a predicted auxiliary token for the corresponding spoken training utterance of the one or more spoken training utterances; and determining an auxiliary task loss based on the predicted auxiliary token generated by the decoder for the corresponding spoken training utterance and the corresponding target sequence of auxiliary tokens; and training the ASR model jointly on the speech recognition loss and the auxiliary task loss determined for each spoken training utterance.

11. The system of claim 10, wherein the ASR model comprises:

a causal encoder configured to:

receive, as input, a sequence of acoustic frames characterizing each of the one or more spoken training utterances; and generate, at each of a plurality of output steps, a first higher order feature representation for a corresponding acoustic frame in the sequence of acoustic frames;

a first prediction network configured to:

receive, as input, a first sequence of non-blank symbols output by a final softmax layer; and generate, at each of the plurality of output steps, a first dense representation; and a first joint network configured to:

receive, as input, the first higher order feature representation generated by the causal encoder at each of the plurality of output steps and the first dense representation generated by the first prediction network at each of the plurality of output steps; and generate, at each of the plurality of output steps, an initial speech recognition hypothesis and an initial predicted auxiliary token.

12. The system of claim 11, wherein the ASR model comprises:

a non-causal causal encoder configured to:

receive, as input, the first higher order feature representation generated by the causal encoder at each of the plurality of output steps; and generate, at each of a plurality of output steps, a second higher order feature representation for a corresponding first higher order feature representation;

a second prediction network configured to:

receive, as input, a second sequence of non-blank symbols output by the final softmax layer; and generate, at each of the plurality of output steps, a second dense representation; and a second joint network configured to:

receive, as input, the second higher order feature representation generated by the non-causal encoder at each of the plurality of output steps and the second dense representation generated by the second prediction network at each of the plurality of output steps; and generate, at each of the plurality of output steps, a final speech recognition hypothesis and a final predicted auxiliary token.

13. The system of claim 10, wherein the decoder generates the speech recognition hypothesis and the predicted auxiliary token synchronously.

14. The system of claim 10, wherein the decoder generates the speech recognition hypothesis and the predicted auxiliary token asynchronously.

15. The system of claim 10, wherein the predicted auxiliary token comprises a capitalization token or a non-capitalization token.

16. The system of claim 15, wherein the auxiliary task loss comprises an uppercase error rate loss.

17. The system of claim 10, wherein the predicted auxiliary token comprises at least one of:

a non-pause token;

a stop token; or a continuation token.

18. The system of claim 17, wherein the auxiliary task loss comprises a pause prediction loss.

\* \* \* \* \*